US010581675B1

(12) United States Patent
Iyer (10) Patent No.: US 10,581,675 B1
(45) Date of Patent: Mar. 3, 2020

(54) METADATA-BASED APPLICATION AND INFRASTRUCTURE DEPLOYMENT

(71) Applicant: Amazon Technologies, Inc., Seattle, WA (US)

(72) Inventor: Balaji Thiagarajan Iyer, Ashburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 15/586,923

(22) Filed: May 4, 2017

(51) Int. Cl.
| H04L 29/06 | (2006.01) |
| H04L 12/24 | (2006.01) |
| H04L 29/08 | (2006.01) |
| G06F 8/60 | (2018.01) |
| G06F 8/41 | (2018.01) |

(52) U.S. Cl.
CPC ............ H04L 41/0806 (2013.01); G06F 8/41 (2013.01); G06F 8/60 (2013.01); H04L 67/10 (2013.01)

(58) Field of Classification Search
CPC ....... H04L 41/0806; H04L 67/10; G06F 8/41; G06F 8/60
See application file for complete search history.

(56) References Cited

U.S. PATENT DOCUMENTS

| 7,900,201 | B1 * | 3/2011 | Qureshi | ................. G06N 5/048 717/174 |
| 2005/0289538 | A1 * | 12/2005 | Black-Ziegelbein | ..... G06F 8/61 717/177 |
| 2013/0262643 | A1 * | 10/2013 | Anderson | ................. G06F 8/60 709/223 |
| 2014/0026131 | A1 * | 1/2014 | Ravi | ......................... G06F 8/60 717/177 |
| 2014/0172405 | A1 * | 6/2014 | Baset | .................. G06F 11/3409 703/22 |
| 2015/0007169 | A1 * | 1/2015 | Li | ........................... H04L 67/10 717/177 |
| 2015/0304175 | A1 * | 10/2015 | Maes | ....................... G06F 8/70 709/226 |
| 2015/0341240 | A1 * | 11/2015 | Iyoob | ..................... H04L 43/08 709/201 |
| 2016/0034277 | A1 * | 2/2016 | Syed | ......................... G06F 8/76 717/136 |
| 2016/0092252 | A1 * | 3/2016 | Wagner | ............... G06F 9/45533 718/1 |
| 2016/0205007 | A1 * | 7/2016 | Syed | ..................... H04L 43/062 709/224 |
| 2018/0046457 | A1 * | 2/2018 | Branca | ...................... G06F 8/60 |

* cited by examiner

*Primary Examiner* — Philip J Chea
*Assistant Examiner* — Wuji Chen
(74) *Attorney, Agent, or Firm* — Lowenstein Sandler LLP (57) ABSTRACT

A system for deploying an application using an infrastructure identified based on metadata associated with source code of the application. The system extracts code metadata during compile time and build time of the application source code. Application configuration parameters are identified from the metadata and matched to an application configuration pattern selected from multiple application configuration patterns stored in a repository. A learning process is applied wherein feedback data is used to create new application configuration patterns and update existing patterns. An infrastructure script is generated using infrastructure parameters identified using the selected application configuration pattern. The infrastructure script is executed to provision an infrastructure for deployment of the application.

18 Claims, 7 Drawing Sheets

METADATA-BASED APPLICATION AND INFRASTRUCTURE DEPLOYMENT

BACKGROUND

Deploying an application in a cloud computing environment traditionally includes a separation between application code development and cloud infrastructure configuration. For example, application code is written independently from the provisioning of cloud resources to execute the application code, without a mapping of the application code and the infrastructure code.

To this end, conventional systems and methods involve provisioning the cloud infrastructure based on customer demand with subsequent scaling changes to accommodate changes in the application code requirements and the customer requirements. Application developers and infrastructure provisioning systems operate in isolation resulting in a lack of coordination between the application deployment code and the infrastructure deployment code.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Embodiments described herein relate to extracting code metadata during compile time and build time of application source code associated with an application. In one embodiment, a metadata configuration file or construct is generated using the extracted metadata. For example, the extracted metadata may include information indicating at least one of a programming language of the application, a size of a binary of the application, a matrix of the binary of the application, the dependencies of the binary of the application, a compile time of the application code, a build time of the application code, etc.

In one embodiment, from the extracted metadata of the metadata configuration file, multiple parameters defining a configuration or requirements associated with the application may be identified (herein referred to as "application parameters"). For example, the application parameters may include a scaling requirement associated with the application, a latency requirement or threshold associated with the application, throughput requirements, network requirements, a network type associated with the application, one or more ports used by the application, one or more database types used by the application (e.g., SQL, MYSQL, etc.), etc. Advantageously, the application parameters represent the code demands associated with an application. In one embodiment, the code demands may be coupled with the customer system demands to model the infrastructure needed to deploy the application on behalf of a customer in a cloud computing environment, as described in greater detail below.

In one embodiment, a repository (e.g., one or more databases) is maintained to store multiple application configuration patterns or deployment pipelines. In one embodiment, a set of candidate application configuration patterns may be developed via a learning process wherein the various patterns are identified, refined, improved, and modified in view of previous mappings of the patterns to various applications and inputs received by the application deployment system (e.g., customer inputs, customer demand information, application deployment performance metrics, etc.).

In one embodiment, the application parameters may be used to select an application configuration pattern from the multiple application configuration patterns to model the application. In one embodiment, the selected application configuration pattern represents an optimal match from among the multiple candidate application configuration patterns stored in the repository in view of the application parameters identified from the extracted metadata of the application.

In one embodiment, a query is sent to a cloud resource service to identify information relating to currently available resources (herein referred to as "resource availability information"). In one embodiment, the cloud resource discovery service collects and aggregates the resource availability information from multiple cloud provider systems (e.g., cloud provider data centers or database data centers) communicatively connected to the application deployment system. For example, the cloud resource service may maintain information identifying the infrastructure resources (e.g., servers, computing components, networks, databases, etc.) that are currently available from among the multiple cloud provider systems and database providers.

In one embodiment, based on the selected application configuration pattern and the resource availability information, multiple infrastructure configuration parameters are identified. In one embodiment, the infrastructure configuration parameters represent the infrastructure requirements associated with deployment of the application. For example, the infrastructure configuration parameters may include the instance provisioning requirements, networking capability requirements, storage requirements (e.g., storage amount, storage type, etc.), etc.

In one embodiment, a script is generated including instructions relating to a cloud provisioning template including the identified infrastructure configuration parameters associated with the application (herein referred to as the "infrastructure script"). In one embodiment, the infrastructure script may be executed to provision an infrastructure for deployment of the application. In one embodiment, the infrastructure script may be configured in view of the resource availability information such that the particular resources required for deployment of the application may be provisioned.

Figure 1:
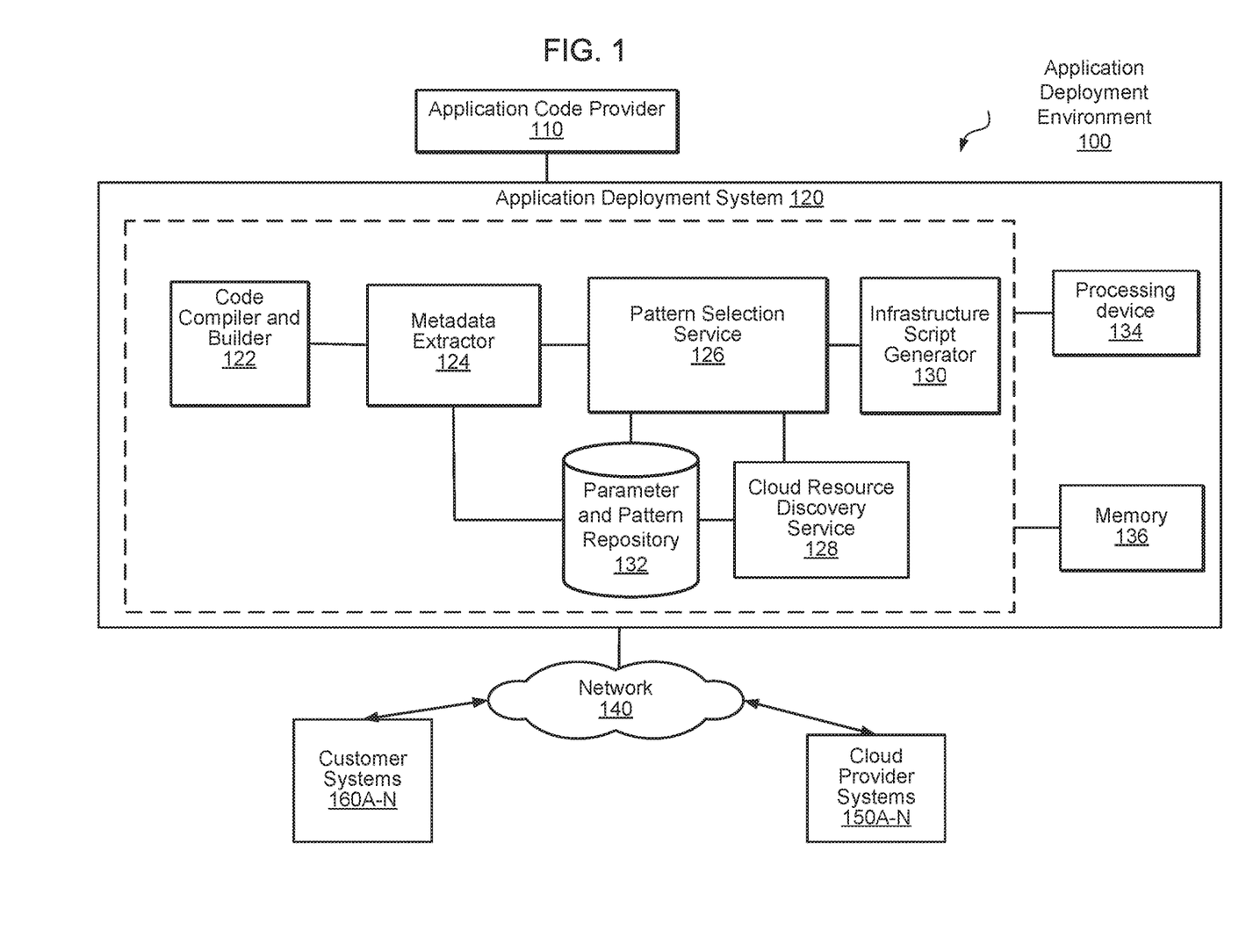
FIG. 1 illustrates an example application deployment environment including an application deployment system, according to one embodiment.

FIG. 1 is a block diagram illustrating various components of an application deployment environment 100 including an application deployment system 120, according to one embodiment. In one embodiment, the application deployment system 120 manages the deployment of an application (also referred to as a "first application") on an infrastructure in a cloud computing environment, as described in detail below. In one embodiment, the application deployment system 120 may include a code compiler and builder 122, a metadata extractor 124, a pattern selection service 126, a cloud resource discovery service 128, an infrastructure script generator 130, and a parameter and pattern repository 132. In one embodiment, the application deployment system 120 may further include a processing device 134 and a memory 136 configured to execute and store instructions associated with the functionality of the various components, services, and modules of the application deployment system 120, as described in greater detail below in connection with FIGS. 2-8.

In one embodiment, the application deployment system 120 may be operatively coupled to an application code provider 110. In one embodiment, the application code provider 110 may be any system configured to provide the source code associated with an application to the application deployment system 120. For example, the application code provider 110 may be a code developer system configured to provide the source code for the application to be deployed via infrastructure of a cloud computing environment (e.g., cloud computing resources provided by one or more cloud provider systems 150A-N) on behalf of one or more customer systems 160A-N.

In one embodiment, the code compiler and builder 122 of the application deployment system 120 receives the source code and translates the source code into executable code during a compile time and build time. In one embodiment, the metadata extractor 124 extracts metadata from the compile time and build time of the source code of the application. In one embodiment, the metadata extractor may be operatively coupled to the code compiler and builder 122 as an application program interface (API)-based service that may be integrated and invoked at compile time and build time. In one embodiment, the metadata extracted from the compile time and build time defines a set of characteristics of the application. For example, the extracted metadata may include information associated with characteristics of the underlying application including information indicating at least one of a programming language of the application, a size of a binary of the application, a matrix of the binary of the application, the dependencies of the binary of the application, a compile time of the application code, a build time of the application code, etc. In one embodiment, a metadata construct or configuration file may be generated and stored which includes the extracted metadata. For example, the metadata configuration file may be in any suitable format (e.g., Extensible Markup Language (XML), JavaScript Object Notation (JSON), YAML, etc.). In one embodiment, the metadata configuration file may be stored in the operatively coupled parameter and pattern repository 132.

In one embodiment, the pattern selector service 126 uses the extracted metadata to identify one or more application parameters defining a configuration or requirements associated with the application. For example, the application parameters may include one or more of a scaling requirement associated with the application, a latency requirement or threshold associated with the application, throughput requirements, network requirements, a network type associated with the application, one or more ports used by the application, one or more database types used by the application (e.g., SQL, MYSQL, etc.), etc.

In one embodiment, the pattern selector service 126 determines a match between the application parameters and an application configuration pattern of multiple candidate application configuration patterns stored in the parameter and pattern repository 132. In one embodiment, the parameter and pattern repository may include any number of application configuration patterns or "metadata pipelines" which may be selected to model the application based on the extracted metadata. In one embodiment, the application configuration patterns may be built, modified, expanded, scaled, and improved over time during a learning phase, as described in greater detail below. In one embodiment, the pattern selector service 126 reviews the candidate application configuration patterns stored in the parameter and pattern repository 132 and selects an application configuration pattern (also referred to as a "first application configuration pattern") that is a best match for the application parameters associated with the application, as derived from the extracted metadata.

In one embodiment, the pattern selector service 126 may assign weights to the various application parameters associated with the application. The assigned weights may then be compared to respective ranges for corresponding parameter values associated with each of the candidate application configuration patterns. In one embodiment, based on the comparison and matching of the weighted application parameters and the candidate application configuration patterns, the pattern selector service 126 may then select the application configuration pattern providing the best or optimal relative match. For example, a ranking may be generated for each of the candidate application configuration patterns based on the comparison to the application parameters of the application and the application configuration pattern having the highest relative ranking may be selected by the pattern selector service 126.

In one embodiment, the pattern selection service 126 may query the operatively coupled cloud resource discovery service 128 to determine information regarding the cloud computing resources that are available (herein referred to as the "resource availability information"). For example, the resource availability information may include information regarding cloud computing resources that are currently available or expected to be available based on information collected and aggregated by the cloud resource discovery service 128 from one or more cloud provider systems 150A-N (e.g., Amazon Web Services®, Microsoft Azure®, etc.). In one embodiment, the cloud resource discovery service aggregates information may be collected from multiple cloud provider systems 150A-N and uses the aggregated information to create a catalog of 'currently' available infrastructure resources. For example, a particular data center or availability zone may report the infrastructure resources that are available for use in the deployment of an application. In one embodiment, the resource availability information may be stored in the parameter and pattern repository 132.

In one embodiment, the selected application configuration pattern is used to determine one or more infrastructure configuration parameters defining the infrastructure or cloud computing resources needed to deploy the application. Example infrastructure configuration parameters may include instance provisioning requirements, networking capability requirements, storage requirements (e.g., storage amount, storage type, etc.), etc. In one embodiment, the infrastructure configuration parameters may be based in part on information relating to the demand for the application from one or customer systems 160A-N. For example, the customer demand information may include information from a customer seeking to deploy the application on their behalf, such as scaling information, availability requirements, an expected or minimum number of requests per second that needs to be supported, an expected or minimum number of customers that needs to be supported, etc.

In one embodiment, the infrastructure script generator 130 generates an infrastructure script using the infrastructure configuration parameters. In one embodiment, the infrastructure script may be based on the resource availability information and the infrastructure configuration parameters derived from the metadata extracted from the compile time and build time of the application. In one embodiment, the cloud resource discovery service 128 may also collect and store the customer demand information received from the one or more customer systems 160A-160N. In one embodiment, the cloud resource discovery service 128 may communicatively couple with the customer systems 160A-N and cloud provider systems 150A-N via a network 140. In one embodiment, the network 140 may be any suitable network, including, for example, the Internet, intranets, extranets, wide area networks (WANs), local area networks (LANs), wired networks, wireless networks, or other suitable networks, etc., or any combination of two or more such networks.

In one embodiment, the infrastructure script may be executed on behalf of a customer to provision an infrastructure for deployment of the application. In one embodiment, the provisioned infrastructure meets the requirements of the application and infrastructure configurations in view of one or more of the resource availability information and customer demand information. Advantageously, the infrastructure script may be generated based on information derived from the metadata extracted from the compile time and build time associated with the source code of the application. Also, in one embodiment, the infrastructure script may be stored (e.g., in the parameter and pattern repository 132) and used for future deployments of the application or other applications, as described in greater detail below.

Figure 2:
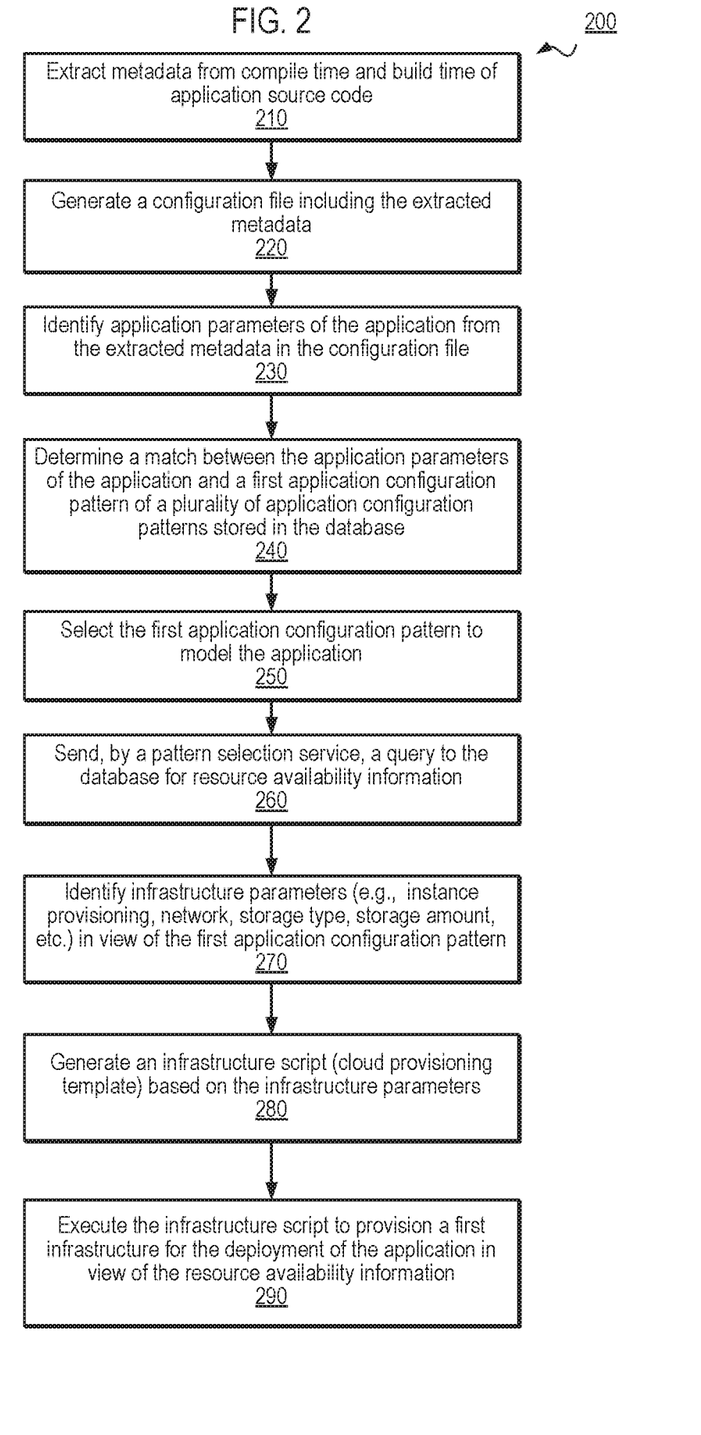
FIG. 2 is a flow diagram illustrating one embodiment of an application deployment process, according to one embodiment.

FIG. 2 illustrates a flowchart that provides an example of a process 200 executed by an application deployment systems (e.g., application deployment system 120 of FIG. 1, according to various embodiments. It is understood that the flowchart of FIG. 2 provides an example of the many different types of functional arrangements that may be employed to implement the operation of the application deployment system 120 as described herein. In one embodiment, the application deployment system executes the method 200 to provision an infrastructure in a cloud computing environment for deployment of an application.

In block 210, metadata is extracted from the compile time and build time of the source code of an application to be deployed. In one embodiment, the source code is received from an application code provider. As described above, the metadata defines a set of characteristics associated with the application and may include, for example, information indicating a language of the application, information relating to the binary files (e.g., matrices, dependencies, size, etc.) of the application.

In block 220, a configuration file including the extracted metadata is generated. IN one embodiment, the construct or configuration file (also referred to as the "metadata configuration file") is stored in a repository in a suitable file format, such as a tree-based file format, XML, JSON, YAML, etc. In one embodiment, the metadata configuration file describes the application in view of the compile time and build time metadata.

In block 230, one or more application parameters are identified from the extracted metadata of the metadata configuration file. In one embodiment, the application parameters may define various aspects or configuration requirements of the application, such as, for example, scaling requirements, latency requirements, port information, database type information, database size information, network requirements, throughput requirements, etc.

In block 240, multiple candidate application configuration patterns are considered in view of the application parameters identified for the application. In one embodiment, a match between the application parameters and a candidate application configuration pattern or pipeline is identified. In one embodiment, the application configuration pattern may be put through a matching processing using the candidate application configuration patterns to identify an optimal application configuration pattern. In one embodiment, the multiple application configuration patterns may be stored in a repository and created, refined, updated, improved, modified using a machine learning process during a learning phase executed by the application deployment system, as described in greater detail with respect to FIG. 3. In one embodiment, a weight may be assigned to each of the application parameters and compared with one or more ranges associated with the parameters of the respective application configuration patterns.

In one embodiment, one or more customer inputs may be considered in determining the match between the application parameters and an application configuration pattern. For example, the one or more customer inputs may include a security policy, lifecycle policy, or compliance policy, customized or particular application requirements, etc. to be applied on behalf of the customer system.

In block 250, one of the multiple candidate application configuration patterns is selected to model the application. In one embodiment, information identifying the selected application configuration pattern is stored in a repository in association with the metadata configuration file of the application.

In block 260, a query is sent to a cloud resource discovery service to obtain resource availability information. In one embodiment, the resource availability information is collected and aggregated from one or more cloud provider systems. For example, the resource availability information may include information identifying available resources that may be used to deploy the application.

In block 270, one or more infrastructure parameters are identified in view of the selected application configuration pattern. In one embodiment, an analysis of the selected application configuration pattern illustrates one or more infrastructure parameters including requirements for the deployment of the application. In one embodiment, the infrastructure parameters may be identified based on the customer demands received from a customer system seeking to deploy the application. In one embodiment, customer inputs may also be considered in determining the infrastructure parameters, in block 270. For example, a customer system may specify a particular required security policy that may be considered in selecting appropriate infrastructure parameters that are configured to implement the identified security policy.

In block 280, an infrastructure script is generated based on the identified infrastructure parameters. In one embodiment, the infrastructure script or coded instructions representing a cloud provisioning template is generated for use in deploying the application. In one embodiment, the generated infrastructure script includes the instructions for provisioning cloud system resources to establish an infrastructure in the cloud computing environment upon which the application may be deployed.

In block 290, the infrastructure script is executed in view of the resource availability information to provision an infrastructure (e.g., a first infrastructure) for the deployment of the application. In one embodiment, the resource availability information represents the currently available computing resources and execution of the infrastructure script in view of this information enables the identification of particular resources (e.g., servers, databases) and associated information to support deployment of the application in view of a particular customer's demands.

In one embodiment, the application deployment system may include or interact with a service configured to receive a notification of an attempted or executed deployment of an application. In one embodiment, the service may receive a notification that an attempted deployment was not successful and rollback to a previous portion of the process 200 or restore one or more infrastructure components to a previous infrastructure configuration.

Figure 3:
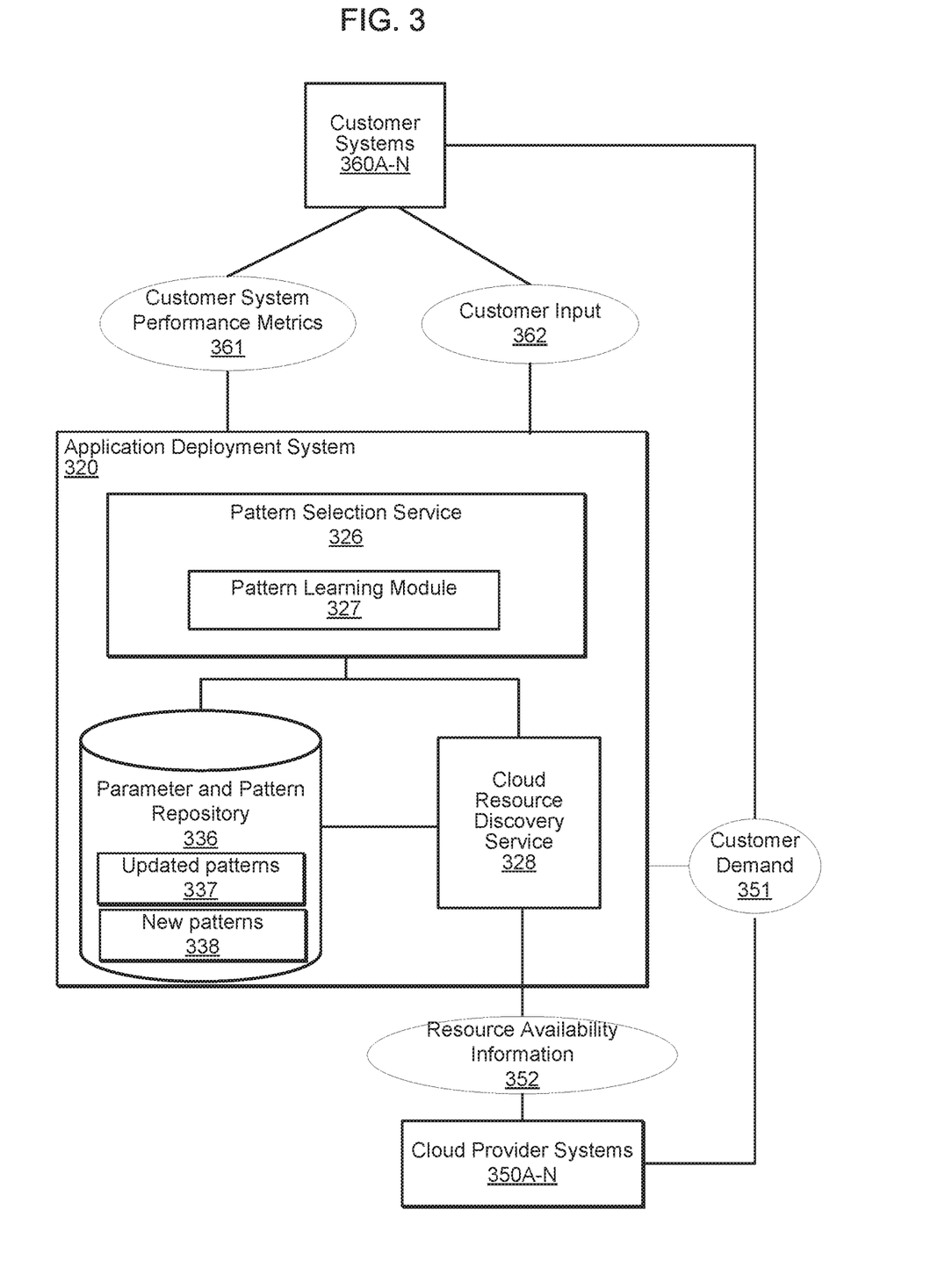
FIG. 3 is a block diagram illustrating an application deployment system to perform a pattern learning process, according to one embodiment.

FIG. 3 is a block diagram illustrating various components of an application deployment system 320, according to one embodiment. In one embodiment, the application deployment system 320 executes a learning phase wherein application configuration patterns are added, modified, improved, and changed (also referred to as "updated patterns") in a machine learning environment to adapt cloud computing resources to customer demands for subsequent deployments of one or more applications. In one embodiment, the application deployment system 320 includes a pattern selection service 326 having a pattern learning module 327. In one embodiment, the pattern learning module 327 may be a set of machine learning instructions configured to generate updated patterns 337 and new patterns 338 for storage in a parameter and pattern repository 336.

As illustrated in FIG. 3, in one embodiment, customer systems 360A-N provide the application deployment system 320 with customer system performance metrics and customer input 362. For example, the customer system performance metrics 361 may include information indicating a performance of one or more applications previously deployed by the application deployment system 320 on behalf of a customer. In one embodiment, the customer system performance metrics 361 may include actual performance data relating to application parameters (e.g., scaling information, latency information, throughput realization, networking performance data, port usage information, database consumption data, etc.) for an application deployed by the application deployment system 320.

In one embodiment, the customer input 362 may include feedback received from the customer systems 360A-N relating to the historical performance of an application deployed by the application deployment system 320. For example, the customer input 362 may include one or more customer requests for changes or modifications to the application parameters or infrastructure parameters associated with the deployment of an application. In another example, the customer input 362 may include a customer's feedback regarding the performance of the application as deployed on the infrastructure configured by the application deployment system 320. In yet another example, the customer input 362 may include input received from a user (e.g., operator of the customer system) into the matching process to approve or select an application configuration pattern or infrastructure configuration parameters from a list of candidate application configuration patterns or potential infrastructure configuration parameters (e.g., the customer may select or override the selection or setting of one or more application parameters, application configuration patterns, customer demand information, or infrastructure parameters). Automatically provision the infrastructure using the application parameters and the infrastructure parameters.

In one embodiment, a cloud provider systems 350A-N providing the infrastructure supporting the deployment of one or more applications receives customer demand 351 associated with one or more applications from the corresponding one or more customer systems 360A-N. In one embodiment, the customer demand 351 (e.g., a frequency that scaling activity is invoked, an amount of storage needed, networking requirements, etc.) processed by the cloud provider systems 350An-N may be used to determine resource availability information 352. As described above, the resource availability information 352 may be provided to a cloud resource discovery service 328 of the application deployment system 320.

In one embodiment, the customer system performance metrics 361, customer input 362, customer demand 351, and resource availability information 352 (collectively referred to as the "feedback data") may be collected and stored in a parameter and pattern repository 336 of the application deployment system 320. In one embodiment, the pattern learning module 327 may implement machine learning processes using the information stored in the parameter and pattern repository 336 to generate the updated patterns for use by the application deployment system 320. For example, the new patterns 338 may include newly added application configuration patterns generated based on the feedback data and existing application configuration patterns that are changed or modified in view of the feedback data. Advantageously, iterative machine learning processing performed by the pattern learning module 327 results in improved application configuration patterns (e.g., the updated patterns 337) and enhanced matching of application parameters derived from the compile time and build time metadata of an application to a selected application configuration pattern of the updated patterns 337.

Figure 4:
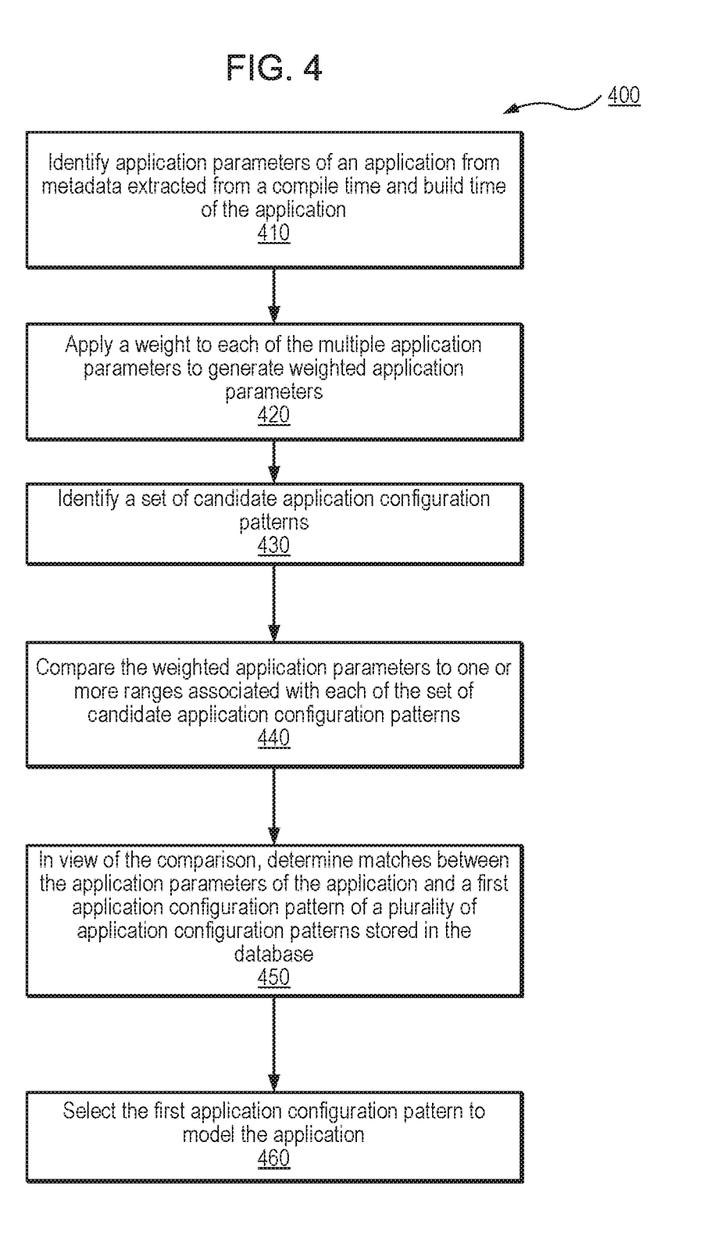
FIG. 4 depicts a flow diagram illustrating an example of an application modeling process, according to one embodiment.

FIG. 4 illustrates a flowchart that provides an example of a process 400 executed by an application deployment system (e.g., application deployment system 120 of FIG. 1 or application deployment system 320 of FIG. 3), according to various embodiments. In one embodiment, the process 400 illustrated in FIG. 4 is directed to selecting an application configuration pattern from multiple stored application configuration patterns, wherein the selected application configuration pattern is used to model an application.

In block 410, application parameters of an application are identified from metadata extracted from a compile time and build time of the application. In block 420, a weight is assigned to each of the multiple application parameters to generate a set of weighted application parameters. In one embodiment, the weights may be selected by the application deployment system on at least a part of the feedback data (described above in connection with FIG. 3), by a customer system, or a combination thereof. For example, the weights may be a numerical value assigned to a respective application parameter to represent an importance of that application parameter as it relates to the identification of an appropriate application parameter pattern. In one embodiment, an application parameter that is assigned a relatively high weight (as compared to the other application parameter weights) may indicate that the highly weighted application parameter is to closely match a corresponding application parameter of the candidate application parameter patterns. For example, a latency requirement indicating a desired latency range of less than 100 milliseconds (e.g., a first application parameter) may be assigned a high importance weight for use during a comparison phase, as described in greater detail below.

In block 430, a set of candidate application configuration patterns may be identified. In one embodiment, the set of candidate application configuration patterns may be filtered or selected from a larger group of application configuration patterns stored in a parameter and pattern repository of the application deployment system. In one example, an initial filter may be applied to the group of application configuration patterns stored in a parameter and pattern repository. In this example, the initial filter may include a look up to identify candidate application configuration patterns having one or more of the application parameters associated with the application.

In block 440, the weighted application parameters of the application are compared to one or more ranges associated with each of the set of candidate application configuration patterns. Using the example above, a first candidate application configuration pattern may have a latency range of 150 milliseconds to 300 milliseconds, a second candidate application configuration pattern may have a latency range of 50 milliseconds to 150 milliseconds, and a third candidate application configuration pattern may have a latency range of 10 milliseconds to 100 milliseconds. In one embodiment, the highly weighted latency requirement of a maximum desired latency of 100 milliseconds is compared to the above-identified ranges to identify a match.

In one embodiment, a similar comparison and matching is performed for the multiple application parameters associated with the application and an application configuration pattern is selected from the candidates, in view of the weights assigned to the respective parameters, in block 450. In one embodiment, the weights assigned to the respective application parameters are considered to compare different candidate application configuration patterns to one another and identify an optimal match (e.g., a first application configuration pattern) to model the application. In one embodiment, the ranges associated with the respective parameters of the candidate application configuration patterns may be designated, changed, updated, and adjusted based on the feedback data analyzed during a learning phase implemented by the application deployment system. In block 460, following a comparison of the application parameters, value ranges of the respective candidate application configuration patterns, and assigned application parameter weights, an application configuration pattern is selected to model the application.

Figure 5:
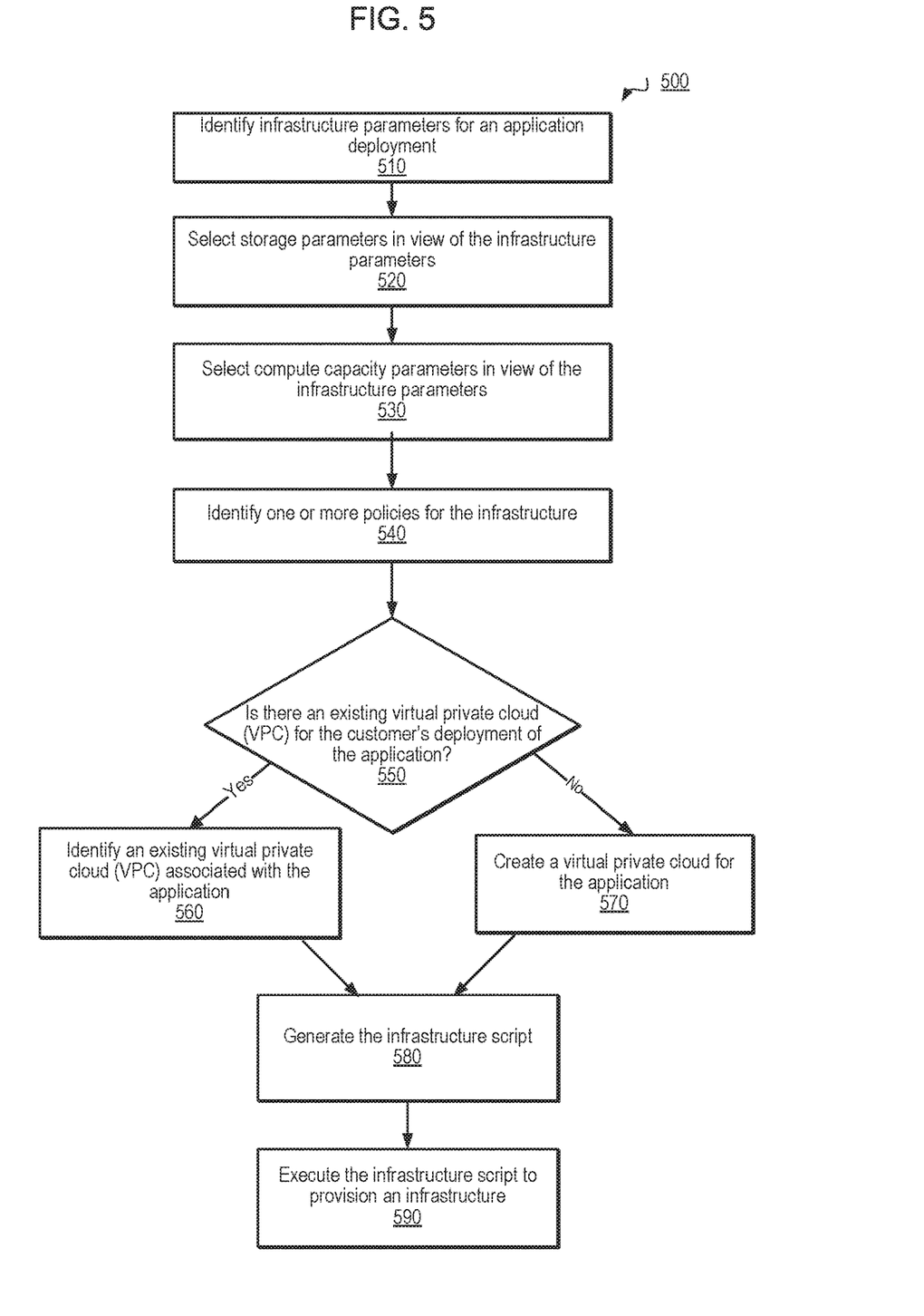
FIG. 5 depicts a flow diagram illustrating an example of an infrastructure script generating process, according to one embodiment.

FIG. 5 illustrates a flowchart that provides an example of a process 500 executed by an application deployment system (e.g., application deployment system 120 of FIG. 1 or application deployment system 320 of FIG. 3), according to various embodiments. In one embodiment, the process 500 illustrated in FIG. 5 is directed to generating an infrastructure script (e.g., the code for provisioning infrastructure for deployment of an application) based on infrastructure parameters derived from compile time and build time metadata.

In block 510, the infrastructure parameters associated with deployment of an application are identified. In block 520, storage parameters are selected, created, and/or configured in view of the infrastructure parameters. In one embodiment, the storage parameters include a selection and configuration of persistent storage block volumes (e.g., Amazon Elastic Block Store (EBS) volume types), data (e.g., objects) storage repository resources (e.g., Amazon Simple Storage Service (S3) buckets or instances), etc.

In block 530, compute capacity parameters are selected, created, and/or configured in view of the infrastructure parameters. In one embodiment, the compute parameters include a selection and configuration of computing resources in a cloud computing environment. For example, the compute capacity parameters may include a virtual computing environment, such as the Amazon Elastic Compute Cloud (EC2) environment. In one embodiment, the compute capacity parameters may include instance types including various combinations of CPU, memory, storage, and networking capacity. In one embodiment, each instance type includes one or more instance sizes to enable scaling based on customer demands.

In block 540, one or more policies are identified and applied for inclusion in an infrastructure script defining the infrastructure to support the application deployment. In one embodiment, the one or more policies may be selected or indicated by a customer system or by the application deployment system. For example, an object lifecycle policy may be identified and applied in building the infrastructure script. In one embodiment, the object lifecycle policy includes a set of rules defining actions to apply to a group of objects. In one embodiment, a data retention policy (e.g., a length of time data is retained and the rules governing how the data is retained) may be applied.

In one embodiment, a security policy is identified and applied for inclusion in the infrastructure script. In one embodiment, the security policy includes a set of rules defining the security controls and protections applied to the infrastructure configured to support the application deployment. In one embodiment, a compliance policy may be identified and applied to the infrastructure script.

In one embodiment, advantageously, in block 540, a customer system may change, update, adjust, modify, or institute one or more of the policies using the application deployment system. For example, a customer may wish to apply a stricter security policy than the current security policy being applied to the deployment of a particular application. In this example, the customer system may implement an instruction to apply the desired security policy and the application deployment system generates a corresponding update to the infrastructure script associated with the application. In one embodiment, the updates or changes to the one or more policies included in the infrastructure script may be implemented at any time by the customer system.

In block 550, a determination is made whether the customer is associated with an existing virtual private cloud (VPC). If yes, the existing VPC is identified, in block 560. If not, a VPC is created, in block 570. In block 580, an infrastructure script is generated to serve as a cloud provisioning template. In one embodiment, the infrastructure script is built to include information indicating the storage parameters, compute capacity parameters, the one or more policies, and the existing or new VPC.

In block 590, the infrastructure script is executed to provision an infrastructure (e.g., a first infrastructure) for deployment of the application. In one embodiment, the provisioned infrastructure includes storage and compute components configured in accordance with the storage parameters and compute capacity parameters and the one or more identified policies (e.g., a lifecycle policy, a security policy, a compliance policy, etc.).

Figure 6:
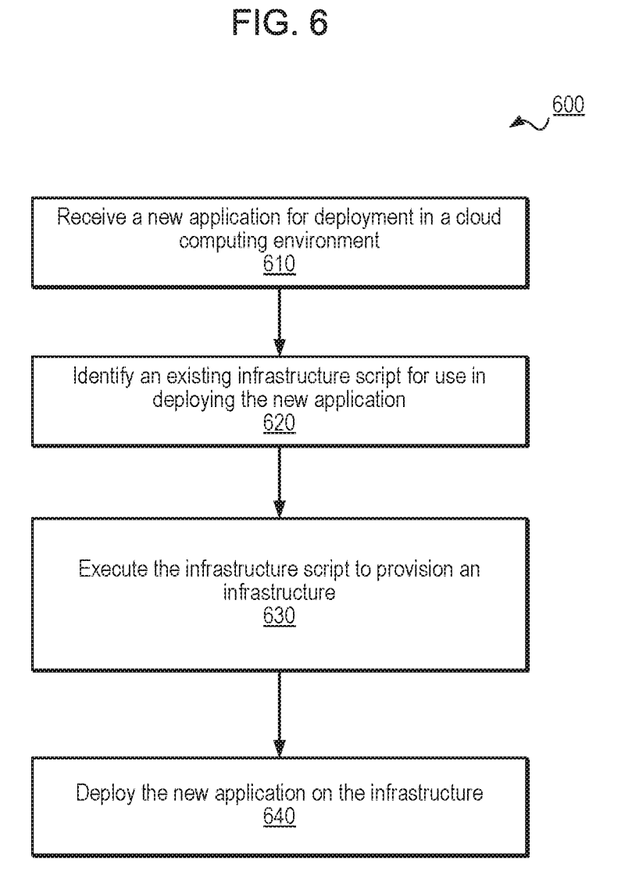
FIG. 6 is a flow diagram illustrating example functionality of an application deployment process, according to one embodiment.

FIG. 6 illustrates a flowchart that provides an example of a process 600 executed by an application deployment system (e.g., application deployment system 120 of FIG. 1 or application deployment system 320 of FIG. 3), according to various embodiments. In one embodiment, FIG. 6 illustrates a process for leveraging an existing or stored infrastructure script (generated according to the methods described above) to provision an infrastructure to support a new application. In one embodiment, multiple applications (e.g., a web application, a database application, etc.) may be grouped into a cluster of applications, such that the cluster of application represents the new application in connection with the execution of process 600.

In block 610, a new application to be deployed in a cloud computing environment is received by the application deployment system. In one embodiment, the application is considered "new" in that the application has not yet been analyzed and mapped to a customized infrastructure script by the application deployment system using a selected application configuration pattern. In block 620, a previously generated infrastructure script may be identified for use with the application. In one embodiment, the infrastructure script may be identified by comparing the new application to an existing application that uses the infrastructure script. For example, the application deployment system may extract metadata from the compile time and build time of the new application and compare that extracted metadata to metadata associated with another application. In one embodiment, a customer system may indicate a selection of the infrastructure script (e.g., in view of an infrastructure profile that represents the parameters and policies of the infrastructure script).

In block 630, the selected infrastructure script is executed to provision an infrastructure (also referred to as "an additional infrastructure", "a new infrastructure", or "a second infrastructure") in accordance with the infrastructure script. In block 640, the new application is deployed on the new infrastructure on behalf of a customer system. In one embodiment, process 600 enables the re-use of a generated infrastructure script in connection with the deployment of a new application. In one embodiment, an existing infrastructure script may be identified and adjusted, changed, or modified in view of information associated with the new application. For example, an existing infrastructure script may be updated in view of a customer demand associated with the new application.

Figure 7:
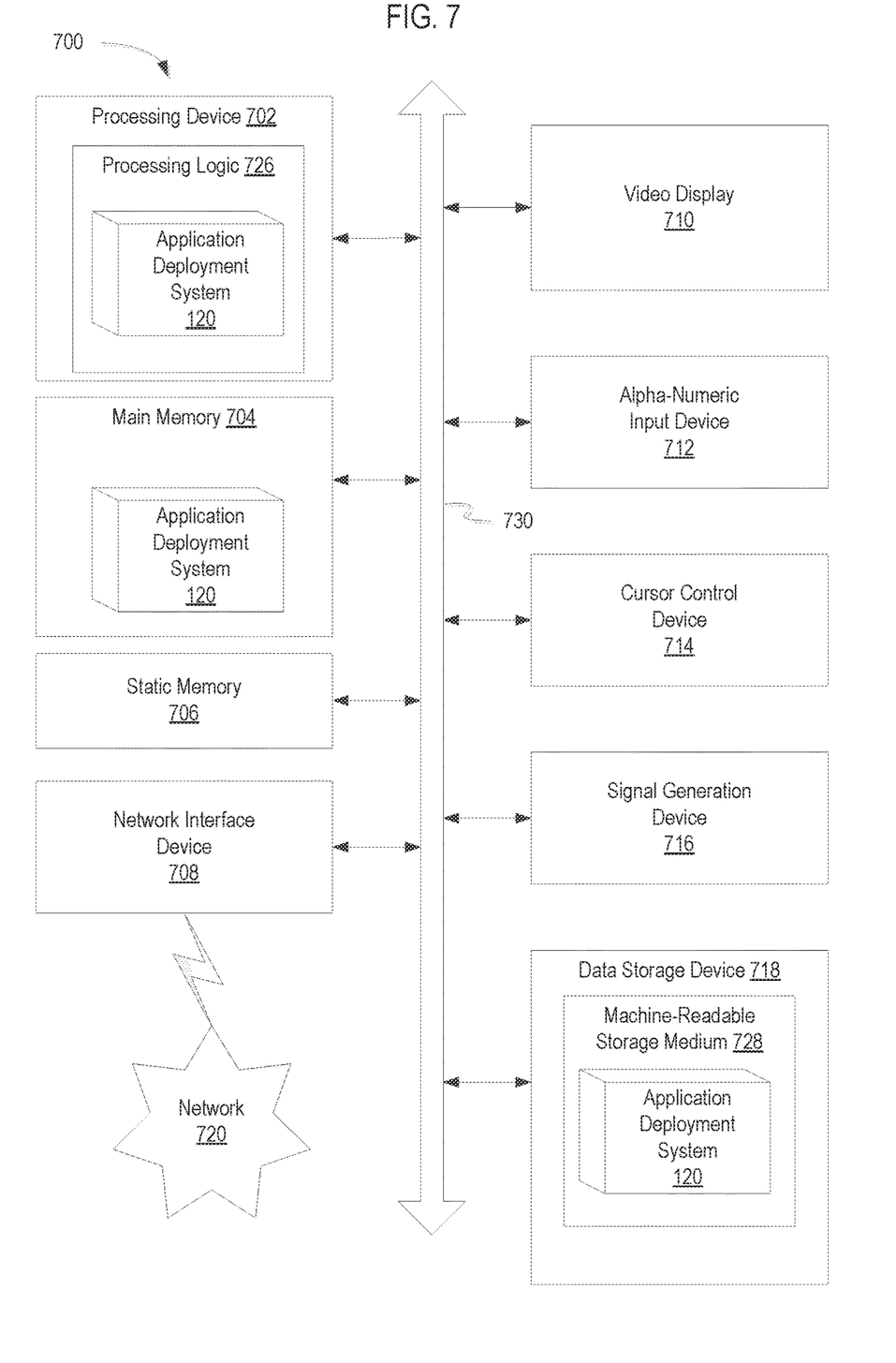
FIG. 7 is a schematic block diagram that provides an example illustration of a computing environment executing instructions relating to deploying an application, according to one embodiment.

FIG. 7 illustrates a diagrammatic representation of a machine in the example form of a computer system 700 including a set of instructions executable by an application deployment system 120 to cause the system to perform any one or more of the methodologies discussed herein. In one embodiment, the application deployment system may include instructions to enable execution of the processes and corresponding components shown and described in connection with FIGS. 1-9.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The example computer system 700 includes a processing device (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. In various implementations of the present disclosure, the processing device 702 is configured to execute instructions for the application deployment system 120 for performing the operations and processes described herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a computer-readable medium 728 on which is stored one or more sets of instructions of the application deployment system 120 embodying any one or more of the methodologies or functions described herein. The instructions may also reside, completely or at least partially, within the main memory 704 and/or within processing logic 726 of the processing device 702 during execution thereof by the computer system 700, the main memory 704 and the processing device 702 also constituting computer-readable media.

The instructions may further be transmitted or received over a network 720 via the network interface device 708. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely presented as examples. Particular implementations may vary from these example details and still be contemplated to be within the scope of the present invention. In the above description, numerous details are set forth.

It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "saving", "pausing", "determining", "applying", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
extracting, by a processing device, code metadata during a compile time and build time of source code of an application;
generating a configuration file comprising the code metadata, wherein the code metadata indicates a language of the application and a size of a binary associated with the application;
identifying, from the code metadata, a plurality of application parameters defining the application, wherein the plurality of application parameters comprise at least one of information associated with one or more ports used by the application, latency information, network information, a database type used by the application; or throughput information associated with the application;
matching the plurality of application parameters to a first application configuration pattern of the plurality of application configuration patterns;
selecting the first application configuration pattern to model the application;
sending, to a second database comprising infrastructure resource availability information aggregated from a plurality of data center servers, a second query for resource availability information;
identifying a plurality of infrastructure configuration parameters in view of the first application configuration pattern and the resource availability information;
matching the plurality of infrastructure configuration parameters with a first application configuration pattern of the plurality of application configuration patterns;
generating an infrastructure script comprising the first infrastructure configuration pattern configured in accordance with the plurality of infrastructure configuration parameters;
executing the infrastructure script to provision a first infrastructure; and deploying the application using the first infrastructure in a cloud computing environment.

2. The method of claim 1, further comprising:
applying a first weight to a first application parameter of the plurality of application parameters to generate a first weighted application parameter;
applying a second weight to a second application parameter of the plurality of application parameters to generate a second weighted application parameter; and
matching the first weighted application parameter and the second weighted application parameter to one or more ranges associated with the first application configuration pattern of the plurality of application configuration patterns.

3. The method of claim 1, further comprising:
receiving at least one of a lifecycle policy or a security policy from a customer system associated with the application; and
generating an updated infrastructure script comprising the at least one of the lifecycle policy or the security policy.

4. A system comprising:
a processing device; and
memory to store computer-executable instructions that, if executed, cause the processing device to:
identify, from code metadata extracted during a compile time and build time of source code of an application, a plurality of application parameters associated with the application;
select, from a plurality of application configuration patterns, a first application configuration pattern matching the plurality of application parameters;
identify resource availability information aggregated from a plurality of servers;
identify a plurality of infrastructure configuration parameters in view of the first application configuration pattern and the resource availability information;
select, from a plurality of infrastructure configuration patterns, a first infrastructure configuration pattern matching the plurality of infrastructure configuration parameters and the resource availability information;
generate an infrastructure script comprising the first infrastructure configuration pattern configured in accordance with the plurality of infrastructure configuration parameters;
execute the infrastructure script to provision a first infrastructure matching the first infrastructure configuration pattern; and
deploy the application using the first infrastructure.

5. The system of claim 4, wherein the code metadata indicates at least one of a language of the application, a size of a binary of the application, a matrix of the binary of the application, the dependencies of the binary of the application, the compile time of the source code of the application, the build time of the source code of the application.

6. The system of claim 4, the processing device to:
collect feedback data associated with the application deployed using the first infrastructure;
execute a learning process using the feedback data; and
generate an updated application configuration pattern comprising at least one change to the first application configuration pattern.

7. The system of claim 6, wherein the feedback data comprises at least one of customer system performance metrics, customer input, customer demand information, or resource availability information.

8. The system of claim 4, the processing device to:
collect feedback data associated with the application deployed using the first infrastructure;
execute a learning process using the feedback data; and
generate a new application configuration pattern comprising at least one change to the first application configuration pattern.

9. The system of claim 4, wherein the infrastructure script comprises first instructions to configure a plurality of resources of the first infrastructure provided by one or more cloud provider systems.

10. The system of claim 9, wherein the first instructions comprise at least one of storage parameters and compute capacity parameters.

11. The system of claim 4, wherein the infrastructure script comprises at least one policy associated with the plurality of resources of the first infrastructure.

12. The system of claim 11, the processing device to provision the first infrastructure in accordance with the at least one policy.

13. The system of claim 12, the processing device to:
receive, from a customer system, information identifying an updated policy associated with the application; and
update the infrastructure script to apply the updated policy.

14. The system of claim 4, the processing device to:
determine a customer system deploying the application is not associated with an existing virtual private cloud environment;
generate information relating to a new virtual private cloud environment; and
generate the infrastructure script including the information relating to the new virtual private cloud environment.

15. The system of claim 4, the processing device to:
identify a new application to be deployed in a cloud computing environment;
match the new application to the infrastructure script;
execute the infrastructure script to provision a second infrastructure; and
deploy the new application on the second infrastructure.

16. A non-transitory computer-readable storage device storing computer-executable instructions that, if executed by a processing device, cause the processing device to:
identify, from code metadata identified during a compile time and a build time of source code of an application, a plurality of application parameters associated with the application;
select, from a plurality of application configuration patterns, a first application configuration pattern matching the plurality of application parameters;
identify resource availability information aggregated from a plurality of servers;
identify a plurality of infrastructure configuration parameters in view of the first application configuration pattern and the resource availability information;
select, from a plurality of infrastructure configuration patterns, a first infrastructure configuration pattern matching the plurality of infrastructure configuration parameters and the resource availability information;
generate an infrastructure script comprising the first infrastructure configuration pattern configured in accordance with the plurality of infrastructure configuration parameters;
receive at least one policy from a customer system associated with the application;
generate an updated infrastructure script comprising the at least one policy;

execute the updated infrastructure script to provision a first infrastructure; and
deploy the application using the first infrastructure in a cloud computing environment.

17. The non-transitory computer-readable storage device of claim 16, wherein the at least one policy comprises at least one of a lifecycle policy, a security policy, or a compliance policy.

18. The non-transitory computer-readable storage device of claim 16, the processing device to:
store the updated infrastructure script in a repository;
execute the updated infrastructure script to provision a second infrastructure; and
deploy a new application using the second infrastructure.

\* \* \* \* \*